US010448240B2

(12) United States Patent
Caruana et al.

(10) Patent No.: US 10,448,240 B2
(45) Date of Patent: *Oct. 15, 2019

(54) METHOD AND SYSTEM FOR COMMUNICATING DATA WITH AN INACCESSIBLE ELECTRONIC DEVICE

(71) Applicant: Gemalto SA, Meudon (FR)

(72) Inventors: Jean-Paul Caruana, Marseilles (FR); Gregory Capomaggio, Rocquevaire (FR)

(73) Assignee: THALES DIS FRANCE SA, Meudon (FR)

(*) Notice: Subject to any disclaimer, the term of this patent is extended or adjusted under 35 U.S.C. 154(b) by 0 days.

This patent is subject to a terminal disclaimer.

(21) Appl. No.: 15/422,615

(22) Filed: Feb. 2, 2017

(65) Prior Publication Data

US 2017/0150345 A1    May 25, 2017

Related U.S. Application Data

(63) Continuation of application No. 13/121,534, filed as application No. PCT/EP2009/059909 on Jul. 30, 2009, now Pat. No. 9,600,752.

(30) Foreign Application Priority Data

Sep. 30, 2008    (EP) .................................. 08305616

(51) Int. Cl.
*H04W 8/00* (2009.01)
*H04W 8/18* (2009.01)
(Continued)

(52) U.S. Cl.
CPC .......... *H04W 8/183* (2013.01); *G06K 7/0008* (2013.01); *G06K 7/0013* (2013.01);
(Continued)

(58) Field of Classification Search
CPC .. G06K 7/0008; G06K 7/10316; G06K 17/00; G06K 19/0723; G06K 19/07769
(Continued)

(56) References Cited

U.S. PATENT DOCUMENTS

2005/0096088 A1* 5/2005 Bae ........................ H04W 12/12
455/558
2005/0274803 A1  12/2005 Lee
(Continued)

FOREIGN PATENT DOCUMENTS

FR    2888974 A1    1/2007

OTHER PUBLICATIONS

Anonymous, Power Line Communication, Wikipedia The Free Encyclopedia (online), Sep. 21, 2008, pp. 1-11.
(Continued)

*Primary Examiner* — Ping Y Hsieh
(74) *Attorney, Agent, or Firm* — Buchanan Ingersoll & Rooney PC

(57) ABSTRACT

The invention relates to a method of communicating data with an electronic device, comprising the step of receiving signals conveyed by an electrical lead. The method is distinguished in that it comprises the following steps: fitting an RF radiofrequency interface with electrical terminals in the device, extracting signals from the electrical lead, and injecting signals resulting from the extracted signals, in the form of frames of radiofrequency signals in the RF interface with electrical terminals. The invention also relates to a radiofrequency communication device, a system comprising the device and a machine using the device.

12 Claims, 2 Drawing Sheets

(51) Int. Cl.
  *G06K 7/00* (2006.01)
  *G06K 7/10* (2006.01)
  *G06K 17/00* (2006.01)
  *G06K 19/07* (2006.01)
  *G06K 19/077* (2006.01)

(52) U.S. Cl.
  CPC ......... *G06K 7/10316* (2013.01); *G06K 17/00* (2013.01); *G06K 19/0723* (2013.01); *G06K 19/07769* (2013.01)

(58) Field of Classification Search
  USPC ......... 455/558; 235/439, 440, 441, 451, 486
  See application file for complete search history.

(56) References Cited

U.S. PATENT DOCUMENTS

2006/0063564 A1   3/2006   Sharma
2007/0249398 A1*  10/2007  Watanabe ............ G06K 7/0008
                                              455/558
2008/0076475 A1*  3/2008   Kim ................... G06K 7/10237
                                              455/558
2009/0036166 A1*  2/2009   Yen ....................... G06K 19/07
                                              455/558

OTHER PUBLICATIONS

Yair Maryanka, Wiring Reduction by Battery Power Line Communication, Internet Article—Yamar Electronics Ltd., May 2000, pp. 1-3.

International Search Report (PCT/ISA/210) dated Oct. 8, 2009 by European Patent Office as the International Searching Authority for International Appln. No. PCT/EP2009/059909.

Written Opinion (PCT/ISA/237) dated Oct. 8, 2009 by European Patent Office as the International Searching Authority for International Appln. No. PCT/EP2009/059909.

\* cited by examiner

METHOD AND SYSTEM FOR COMMUNICATING DATA WITH AN INACCESSIBLE ELECTRONIC DEVICE

The invention concerns a method and system for communicating data with an electronic device, comprising the step or means of receiving signals conveyed by an electrical connecting conductor.

It also concerns in particular subscriber identification devices such as SIM modules or universal SIM (USIM) modules intended to equip apparatus provided with radio frequency communication means in particular of the cell type.

M2M modules are subscriber identification devices, such as SIM cards, fixed in various new targets such as cars, drinks dispensers or other machines, equipment, installations, etc, where these new targets are able to develop.

These modules are firmly fixed in these appliances and are robust. Moreover, no external connection is provided or possible for communicating with these modules and there exist a large number of integration constraints according to the type of machine concerned. For example, in a car, the M2M module could be integrated under the seat or anywhere without any direct access.

One solution for accessing these modules and modifying the memory content is to download data using radio frequency communicating means of the mobile or cellular telephone network that they equip and to which the modules are connected by ohmic contact.

However, it is desirable to be able to personalise the SIM module in order to be able to access the network of an operator or to change operator or number from the start before initiating the communication and to personalise the module, where applicable.

At the present time, it is therefore very difficult to physically access the module so as to send data, in particular personalisation data.

There is therefore at the present time a need for effecting direct management of the SIM module, in particular for personalisation and updating, where the module may be difficult to access or even very difficult to locate.

Concerning communication methods with a subscriber identification module, the patent FR 2 888 974 is known, which describes how to communicate between a mobile telephone and an SIM module chip by slight modulation of the supply voltage, the demodulation being performed in the chip. This solution has the drawback of requiring significant adaptations in the design of the integrated circuit chips.

The invention aims to satisfy the above requirement of enabling personalisation of an M2M SIM module whatever its integration level or mode and without access where applicable.

The invention consists in its principle of providing in the device an RF interface capable of receiving signal frames of the radio frequency type, and then receiving the data via a conductor and extracting the data from the conductor in order to inject them into the RF interface.

Considering that the interface of a device is difficult to access even in radio frequency having regard to a metal environment, the basic idea is to convey the data until they are close to the device using in particular the structure of the machine or existing circuit wiring and taking and where applicable converting the data into signals that can be used by the RF circuit.

Advantageously, the signal is taken and/or converted in the form of frames of the analogue radio frequency type so as to be directly injected electrically on an electrical-contact interface of the radio frequency device. Advantageously, the device comprises a subscriber identification module of the combi type, the supply taking place by electrical contact in a conventional manner, while the other face makes it possible to receive RF signals by electrical contact.

The RF signal being 13.56 MHz in accordance with ISO/IEC 14443 and all the other layers (software, protocol, connection layer) are based on ISO/IEC 14443. By means of the invention it is possible to use a combi SIM chip as the SIM chip.

Thus, by means of the invention, there is no integration constraint for the machine manufacturer. It is not necessary to know the location of the M2M module, which can be located anywhere.

There is also no integration constraint for the module manufacturer so as to personalise the M2M module in situ.

There is also no integration constraint for the module manufacturer to manufacture a specific SIM since a combi SIM already exists.

The invention also makes it possible to connect and address several modules by virtue of the anti-collision properties.

To this end, the object of the invention is a method of communicating data with an electronic device, comprising the step of receiving signals conveyed by an electrical connecting conductor. The method is distinguished in that it comprises the following steps:
- establishment of a radio frequency RF interface with electrical contacts in the device,
- extraction of the signals from the electrical connecting conductor, and
- injection of the signals resulting from the extracted signals, in the form of radio frequency signal frames in the RF interface with electrical contacts.

According to other implementation features:
- the data are transmitted by modulating radio frequency signals on a power signal conveyed by the electrical conductor;
- the transmission takes place with a radio frequency reader having a capacitive interface with the conductor in order to inject the radio frequency signal onto the conductor;
- the device comprises a subscriber identification module (M2M).

The invention also concerns an electronic device comprising means of receiving signals conveyed by an electrical connecting conductor.

The device is distinguished in that it comprises:
- a radio frequency interface RF with electrical contacts,
- means of extracting signals from the electrical connecting conductor, and
- injection means for injecting signals resulting from the extracted signals in the form of radio frequency frames in the RF interface with electrical contacts.

According to other embodiments of the device:
- the conductor forms part of a power supply circuit;
- the device comprises an identification module (M2M) of the combi type, the supply circuit being a DC supply of the combi circuit.

The invention also concerns a system comprising the above device. The system is distinguished in that it also comprises an electrical connecting conductor for transmitting data intended for the device and means of generating data on the electrical conductor.

According to another feature, the transmission takes place with a reader of the RF contactless type having a capacitive interface with the electrical connecting conductor in order to inject signals onto the conductor.

The invention also concerns a machine comprising the device according to the above and/or being equipped with the above system and/or being able to implement the above method.

Other particularities and advantages of the invention will emerge from a reading of the description given by way of non-limitative example and with regard to the accompanying drawings, in which.

Figure 1:
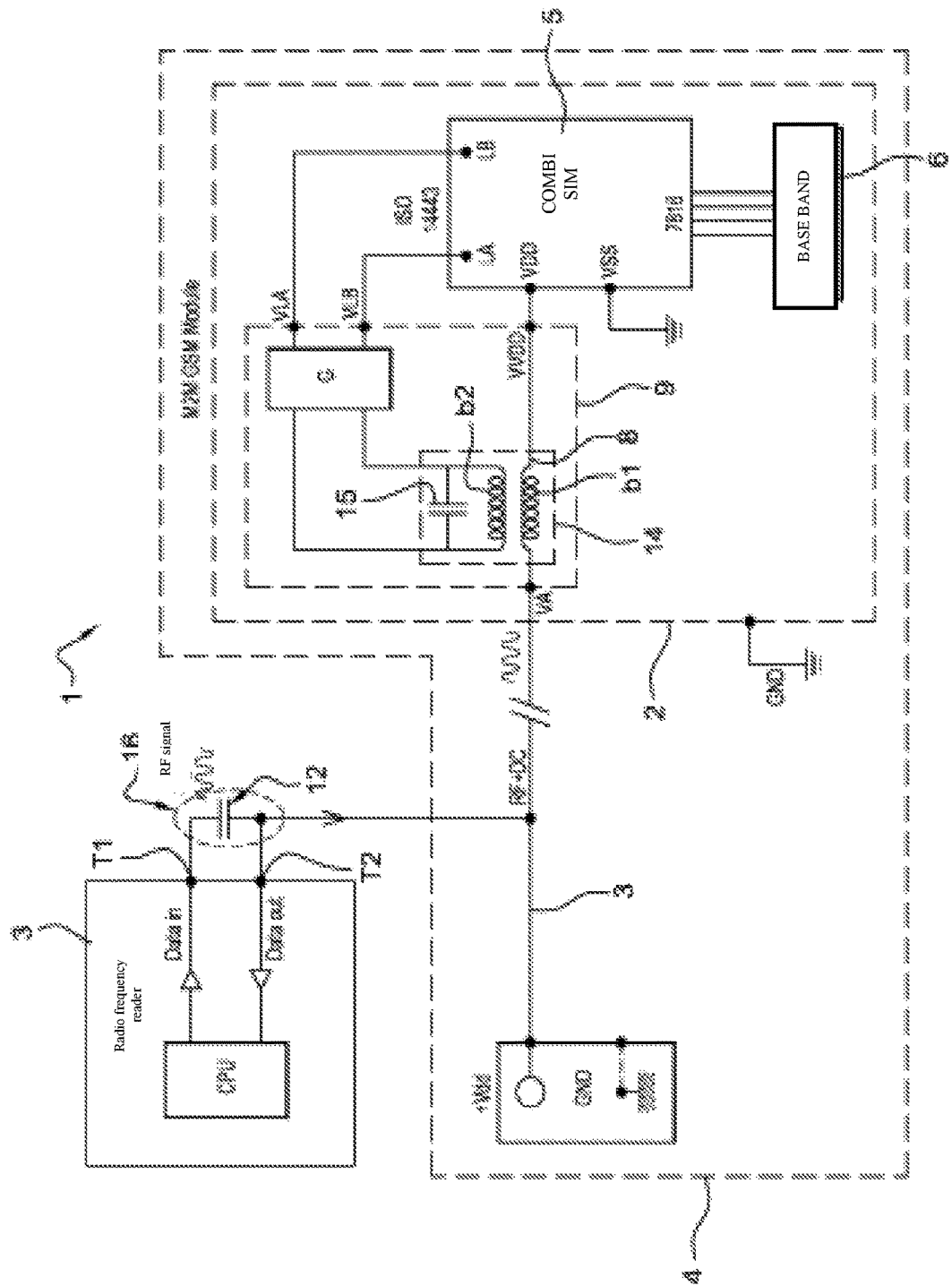
FIG. 1 illustrates a radio frequency communication system according to a preferred embodiment of the invention.

In FIG. 1, a radio frequency communication system 1 comprising a radio frequency RF device 2, an electrical connecting conductor 3 for transmitting data to the device, and means 3 of generating a modulated radio frequency signal on the electrical conductor.

The device 2 can be included in any element 4 such as an electronic communication device/apparatus, personal assistant, PDA, portable computer, machine, distributor, structure, motor vehicle, any equipment etc intended to communicate by means of a radio frequency circuit 5.

The equipment 2 conventionally comprises an electronic processing unit with processor 6 (so-called base band) intended to manage the telephony function and any peripherals, in particular a SIM card 5, the GSM application relating in particular to identification, a telephone network and/or other optional applications, such as for example a remote recharging application or other.

According to the invention the device comprises an RF contactless circuit having a radio frequency RF interface with electrical contacts. In the example, this circuit consists of a SIM card of the combi type, that is to say comprising a dual interface with contact according to ISO 7816 and a radio frequency interface LA, LB according to ISO 14443.

Connections CLK, RST, GND, I/O of the base electronic unit 5 are implemented conventionally on the corresponding electrical contacts of the UICC, SIM or (U)SIM card in accordance with one of the ISO 7816 standards, for example via a block of connectors with eight contacts placed in the apparatus (or soldered) and corresponding to the electrical contact surfaces of the SIM card.

The device or circuit or SIM module can also be permanently fixed in any apparatus, in particular by welding to a printed circuit card of any apparatus.

According to a preferred embodiment of the invention, the device 2 comprises means of extracting data in order to inject them electrically on the RF interface. The extraction means consist in the example of an adaptation circuit 7 and a converter 9 able to extract the data on a power supply circuit element 8.

In this case, the converter comprises a coupling of a first coil on a second coil placed between the supply pin VDD of the combi SIM and the input of a supply of the device. A capacitor is connected at the terminals of the coil, which is connected to the voltage adaptation circuit 7 before supplying the pins LA and LB of the ISO 14443 interface of the combi SIM.

The extraction means 9, 14 are here advantageously situated outside the RF circuit contained in the SIM. They may be the subject of an external extraction component 9, 14 that would be added or fixed to the standard SIM module.

The RF circuit of the SIM comprises, in a known manner, means for receiving and processing radio frequency signal frames arriving on the terminals LA, LB.

The device is supplied by an energy source, in particular a battery 10, by a conductor 3 connecting the terminal VDD of the device through the coil b1. The earth pin Vss is connected to the earth GND of the chassis of the apparatus (car, dispenser).

According to a preferred embodiment, the invention uses an electrical connecting conductor for transmitting data to the device.

In the example, as a normal DC supply is provided for the SIM in a machine comprising an M2M module, the supply conductor 3 is used for conveying the RF signals according to carrier current technology.

The radio frequency circuit, in the example, is included in an M2M identification module of the combi type and the supply circuit is a DC supply of the combi circuit.

In another example where the machine is a car, the SIM could be supplied by conducting means connected to a battery with a voltage adapter.

According to the preferred embodiment of the invention, the system also comprises means 3 of generating a modulated radio frequency signal on the electrical conductor for transmitting data. The injection takes place by electrical contact with the electrical connecting conductor.

In the example, these means comprise or constitute a conventional radio frequency reader or terminal 3 comprising a radio frequency interface with electrical contact with terminals T1, T2 intended normally to receive a radio frequency antenna.

For implementing the method, the terminal comprises modulation/demodulation means able to modulate/demodulate the "data in" radio frequency signal and/or to demodulate the signal coming on the "data out" conducting wire. These means in the example comprise a capacitive interface with the electrical connecting conductor in order to inject the RF signal on the conductor. For this purpose, a capacitor 12 replaces the antenna and a terminal of the capacitor is connected to the electrical connecting conductor 3.

Advantageously, the conductor corresponds to the supply cable of the device; this conductor may or may not convey or carry the supply power signal of the device. The important thing according to the preferred embodiment being that the conductor passes close to the device to allow extraction or interception.

The above system is normally intended to equip a machine comprising the above device and/or being able to implement the method that will be described below.

Figure 2:
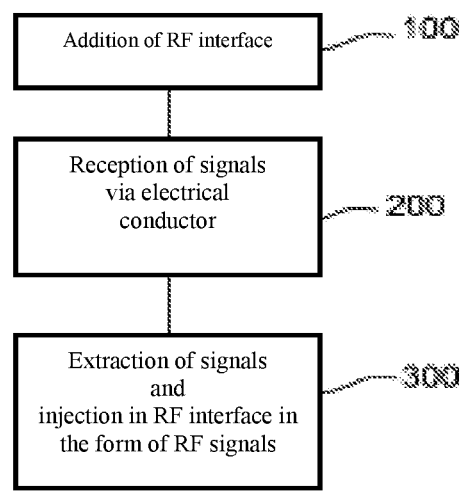
FIG. 2 illustrates the steps of the method of the invention according to a preferred embodiment.

The functioning of the system of FIG. 1 will be explained in relation to the steps of the method by means of FIG. 2.

The above adaptive system is used to effect an RF transaction with a device in the form of a SIM module comprising according to the invention a radio frequency interface that has been added (100) since normally the SIM module does not need to include one when it can be satisfied with an ISO 7816 interface. The interface functions here on a frequency of 13.56 MHz and the module equips a car. More exactly, the module is of the combi type with a dual communication interface with contact according to ISO 7816 and with an antenna according to ISO 14443.

During a transaction operation the purpose of which is an initialisation or personalisation or updating of data contained in the SIM, a user connects a terminal 3 to the cigar lighter without needing to extract the SIM or access an interface, the SIM being situated under the seat or in an inaccessible place in the car.

The cigar lighter is connected with the supply circuit of the M2M SIM module. Where applicable, a regulator transforms the voltage in order to adapt it to the SIM.

The terminal of the adapted RF contactless type opens a communication session with the M2M module and transmits data, in particular authentication data with a view to updating.

The data are generated conventionally in the form of an RF signal by the terminal and transmitted to its interface T1, T2.

The RF signal is transmitted to the capacitive interface that the terminal has with the conductor in order to inject and demodulate the RF signal on the conductor.

The RF signal therefore arrives at the terminals of the capacitor 12 itself connected to the electrical connecting conductor, consisting here of the supply conductor of the SIM module. The data are therefore transmitted by modulating radio frequency signals on a power signal conveyed by an electrical conductor. Thereby use is judiciously made of an existing circuit of the car, which comprises via the cigar lighter as an entry point signals that can propagate as far as the module via the supply circuit.

Advantageously, the frames of the RF signals transmitted and/or received are compatible with ISO/IEC 14443 and have a frequency of 13.56 MHz. Thus the modifications to the terminal are minor or even nil in order to communicate and/or receive signals and data.

The RF signal is then superimposed on the DC carrier current of the conductor, which supplies the VDD point of the SIM card.

According to the preferred embodiment of the invention, signals conveyed by the conductor are received (200). In the example, it is the set of RF signals superimposed on the continuous signal that reaches the converter 9.

Next, according to a step (300), the signals are extracted from the conductor. For this purpose, the signals arrive in the converter 9 and pass through the coil 1 before reaching the SIM card.

RF signals induced in the coil b1 are recovered by the second coil b2 and capacitor 15.

Next, according to the preferred step (300) of the method, the signals resulting from the extracted signals are injected into the RF interface in the form of RF signals.

In the example, the signals are injected electrically at the RF interface of the SIM module after having been adapted for voltage by the adaptation stage G into a voltage accepted by the SIM module.

The radio frequency frames arriving at the RF interface terminals LA, LB of the combi SIM module have the same characteristics as if they had come from an antenna connected to the points LA, LB.

By virtue of the invention, the data are extracted from the RF circuit or from the SIM module in order to inject them electrically on the RF interface of the SIM module. Thereby there are few or no modifications to be made to the SIM module. In addition, an adaptation may be made with adaptation means placed outside a standard combi SIM card added to it, in the form in particular of an adaptation component 14 comprising the elements 9, G and having the three connectors VVDD, VLA, VLB connected respectively to VDD, LA, LB and a connector VA to be connected to the supply voltage.

In order to communicate data to the SIM modules, it is possible to employ any known modulation technique such as for example amplitude modulation, frequency modulation or phase modulation, which would be injected onto a conductor or communication medium available in the machine and passing close to the SIM module.

Close to the module, an adaptation means recovers the signal, converts it where necessary into a signal acceptable to the module and injects it into the module.

Various ways known to persons skilled in the art for coding data and information with the associated protocol can be used.

In a variant, the signal is recovered on the conductor and then converted into a radio frequency signal by means of a coil coupled to an interface with an antenna of the module.

The principle of the invention can be applied and adapted for the use of any electrical network, in particular the national network at 220 V, for communicating in a cabled manner with a radio frequency device, in particular a SIM module.

By virtue of the invention, it is possible to judiciously use the analogue properties of the RF contactless interface to extract the signal;

It is possible to use the frequency properties of the contactless interface to separate the data related to the DC current;

It is possible to use the anti-collision properties of the contactless interface to connect several modules, in particular M2M, to the same conductor circuit or supply network;

It is possible to use the contactless protocol to transfer the SIM commands without modification to the set of commands used for personalising.

The invention claimed is:

1. A method for communicating with a subscriber identity module having a radio frequency (RF) interface with electrical terminals, comprising:
    transmitting radio frequency signals via an electrical connection lead connected to a terminal of the subscriber identity module other than the electrical terminals of the RF interface, the radio frequency signals containing data for the subscriber identity module;
    extracting the radio frequency signals from the electrical connection lead; and
    injecting signals resulting from the extracted signals into the electrical terminals of the RF interface of the module, in the form of RF frames.

2. The method according to claim 1, wherein the data is transmitted by modulating radio frequency signals on a power signal conveyed by an electrical conductor.

3. The method according to claim 2, wherein the transmission takes place with a radio frequency reader having a capacitive interface with a conductor to inject the radio frequency signals on the conductor.

4. The method according to claim 1, wherein the radio frequency signals are compatible with ISO/IEC 14443 and have a frequency of 13.56 MHz.

5. The method according to claim 1, wherein the radio frequency signals are received from a connecting conductor, wherein the connecting conductor is a supply cable conveying a DC voltage used by the subscriber identity module.

6. An electronic device comprising:
    a subscriber identity module;
    a radio frequency (RF) interface with electrical terminals connected to the subscriber identity module, and
    a converter circuit that extracts a radio frequency signal conveyed via an electrical connection lead connected to a terminal of the subscriber identity module other than the electrical terminals of the RF interface, and injects a signal resulting from the extracted signal into the electrical terminals of the RF interface, in the form of RF frames.

7. The device according to claim 6, wherein:
the electrical connection lead comprises a conductor that forms part of a power supply circuit and is configured to receive radio frequency signals.

8. The device according to claim 7, wherein the subscriber identity module is of a dual-interface combi type with electrical contacts and antenna, the supply circuit being a DC supply of the combi circuit.

9. A radio frequency communication system comprising the electronic device according to claim 7, wherein the communication system also comprises:
the power supply circuit conductor for transmitting data destined for the device; and
means for generating signals comprising the data, and for injecting the signals on the conductor.

10. The system according to claim 9, wherein the transmission takes place with a reader of the RF contactless type having a capacitive interface with the conductor for injecting signals on the conductor.

11. A machine comprising the system according to claim 9.

12. A machine comprising the device according to claim 6.

* * * * *